United States Patent
Fischer et al.

(10) Patent No.: US 9,289,966 B2
(45) Date of Patent: Mar. 22, 2016

(54) METAL LAYER-FREE MULTI-LAYER FILM WITH LOW SURFACE WEIGHT

(71) Applicant: MARIA SOELL HIGH TECHNOLOGY FILMS GMBH, Nidda-Eichelsdorf (DE)

(72) Inventors: Christian Erich Fischer, Bruckberg (DE); Achim Borm, Bad Nauheim (DE); Thomas Blum, Verden (DE)

(73) Assignee: MARIA SOELL HIGH TECHNOLOGY FILMS GMBH, Nidda-Eichelsdorf (DE)

( * ) Notice: Subject to any disclaimer, the term of this patent is extended or adjusted under 35 U.S.C. 154(b) by 159 days.

(21) Appl. No.: 14/363,326

(22) PCT Filed: Dec. 4, 2012

(86) PCT No.: PCT/EP2012/004990
§ 371 (c)(1),
(2) Date: Jun. 6, 2014

(87) PCT Pub. No.: WO2013/083261
PCT Pub. Date: Jun. 13, 2013

(65) Prior Publication Data
US 2014/0306056 A1    Oct. 16, 2014

(30) Foreign Application Priority Data

Dec. 9, 2011  (DE) .......................... 10 2011 120 604
Mar. 30, 2012  (DE) .......................... 10 2012 006 416

(51) Int. Cl.
*B32B 27/08*    (2006.01)
*B32B 7/12*    (2006.01)
*B32B 27/30*    (2006.01)
*B32B 27/32*    (2006.01)
*B32B 27/34*    (2006.01)
*B64B 1/58*    (2006.01)
*B64B 1/14*    (2006.01)
*B32B 1/00*    (2006.01)
*B64B 1/40*    (2006.01)
*A63H 27/10*    (2006.01)

(52) U.S. Cl.
CPC ................ *B32B 27/08* (2013.01); *A63H 27/10* (2013.01); *B32B 1/00* (2013.01); *B32B 7/12* (2013.01); *B32B 27/306* (2013.01); *B32B 27/32* (2013.01); *B32B 27/34* (2013.01); *B64B 1/14* (2013.01); *B64B 1/40* (2013.01); *B64B 1/58* (2013.01); *A63H 2027/1025* (2013.01); *B32B 2250/05* (2013.01); *B32B 2250/24* (2013.01); *B32B 2270/00* (2013.01); *B32B 2307/304* (2013.01); *B32B 2307/31* (2013.01); *B32B 2307/4023* (2013.01); *B32B 2307/4026* (2013.01); *B32B 2307/412* (2013.01); *B32B 2307/51* (2013.01); *B32B 2307/518* (2013.01); *B32B 2307/581* (2013.01); *B32B 2307/718* (2013.01); *B32B 2307/72* (2013.01); *B32B 2307/7244* (2013.01); *B32B 2307/734* (2013.01); *B32B 2307/75* (2013.01); *B32B 2605/00* (2013.01); *Y10T 428/24802* (2015.01)

(58) Field of Classification Search
CPC .......... B32B 27/08; B32B 1/00; B32B 27/32; B32B 27/34; B32B 7/12; B32B 27/306; B32B 2270/00; B32B 2605/00; B32B 2307/51; B32B 2307/4026; B32B 2307/7244; B64B 1/40; B64B 1/14; B64B 1/58; A63H 27/10; Y10T 428/24802
See application file for complete search history.

(56) References Cited

U.S. PATENT DOCUMENTS

| 6,435,935 B1 | 8/2002 | Komaba | |
| 6,599,639 B2 | 7/2003 | Dayrit et al. | |
| 2003/0017352 A1* | 1/2003 | Dayrit | ....................... A23L 3/02 |
| | | | 428/475.8 |
| 2003/0111760 A1 | 6/2003 | Dyke et al. | |
| 2007/0160789 A1* | 7/2007 | Merical | ..................... B32B 7/02 |
| | | | 428/35.7 |
| 2009/0022919 A1* | 1/2009 | Chicarella | .............. A63H 27/10 |
| | | | 428/35.9 |
| 2010/0159795 A1* | 6/2010 | Sarnstrom | .............. A63H 27/10 |
| | | | 446/220 |
| 2011/0123785 A1 | 5/2011 | Garcia et al. | |

(Continued)

FOREIGN PATENT DOCUMENTS

| CN | 1724254 A | 1/2006 |
| DE | 602 12 816 T2 | 11/2006 |

(Continued)

OTHER PUBLICATIONS

International Search Report of corresponding PCT/EP2012/004990 mailed Apr. 26, 2013.

(Continued)

*Primary Examiner* — Valentina Xavier
(74) *Attorney, Agent, or Firm* — Norris McLaughlin & Marcus, P.A.

(57) ABSTRACT

A metal layer-free multi-layer film with a surface weight of ≤33 g/m², shrinkage behavior of ≤10% at 90° C. as described herein and a layer structure: a layer (a) composed of at least one thermoplastic olefin homopolymer or copolymer as an outer layer, an adhesive layer (b) inseparable under a cohesion peeling effect, a layer (c) of at least one homopolyamide and/or copolyamide, at least one internal gas barrier layer (d) adjoining layer (c) and differing from layers (c) and (e) in the composition of the polymer component(s), a layer (e) adjoining the gas barrier layer (d) and composed of at least one homopolyamide and/or copolyamide, and a layer (i) of at least one homopolyamide and/or copolyamide as an outer layer. Also disclosed is a method of using such a multi-layer film for the production of a buoyancy/lift body and a buoyancy/lift body made of such a multi-layer film.

27 Claims, No Drawings

(56) References Cited

U.S. PATENT DOCUMENTS

| | | | | |
|---|---|---|---|---|
| 2014/0255658 A1* | 9/2014 | Muslet | ............... | B32B 5/022 |
| | | | | 428/189 |
| 2015/0118461 A1* | 4/2015 | Mount, III | ............ | B32B 7/12 |
| | | | | 428/209 |
| 2015/0336652 A1* | 11/2015 | Smith | ............ | B64B 1/40 |
| | | | | 244/31 |

FOREIGN PATENT DOCUMENTS

| | | |
|---|---|---|
| DE | 603 04 650 T2 | 4/2007 |
| DE | 10 2007 013 710 A1 | 9/2008 |
| DE | 20 2011 005 161 U1 | 8/2011 |
| EP | 1 410 902 A1 | 4/2004 |
| JP | H 07290650 A | 11/1995 |
| JP | 2001039396 A | 2/2001 |
| JP | 2004 230628 A | 8/2004 |
| WO | 2006 094733 A1 | 9/2006 |
| WO | 2010 075034 A1 | 7/2010 |

OTHER PUBLICATIONS

German Search Report of corresponding DE 10 2012 006 416.0 dated Sep. 19, 2012.

* cited by examiner

METAL LAYER-FREE MULTI-LAYER FILM WITH LOW SURFACE WEIGHT

This application is a 371 of International Patent Application No. PCT/EP2012/004990, filed on Dec. 4, 2012, which claims foreign priority benefits under 35 U.S.C. §119 of German Patent Application No. 10 2011 120 604.7, filed Dec. 9, 2011, and German Patent Application No. 10 2012 006 416.0, filed Mar. 30, 2012, the disclosures of which patent applications are incorporated herein by reference.

The present invention relates to a metal-layer-free multilayer film with weight per unit area ≤33 g/m², with shrinkage ≤10% at 90° C. (both in machine direction and perpendicularly to machine direction, determined as dimensional change in accordance with DIN 53377), and with an at least six-layer layer structure comprising a layer (a) composed of at least one thermoplastic olefin homo- or copolymer as one of the external layers, a non-peelable adhesion-promoter layer (b) as defined hereinafter, a layer (c) composed of at least one homo- and/or copolyamide, at least one internal gas-barrier layer (d) which adjoins the layer (c) and which differs at least in the composition of the polymer component(s) from the layers (c) and (e); a layer (e) which adjoins the gas-barrier layer (d) and which is composed of at least one homo- and/or copolyamide, and a layer (i) composed of at least one homo- and/or copolyamide as one of the external layers, to a use of such multilayer film for the production of a buoyancy body, and also to a buoyancy body made of this type of multilayer film.

The prior art, e.g. U.S. Pat. No. 6,435,935 B1, WO 2010/075034, DE 10 2007 013 710 A1 and US 2009/0022919 A1, have already disclosed multilayer films suitable for the production of buoyancy bodies, for example balloons. However, said multilayer films mostly have one metal layer for reliable provision of an sufficient gas-transmission barrier with respect to water vapor, air, and in particular helium.

However, buoyancy bodies made of a metal-layer-containing multilayer film can be problematic, since these buoyancy bodies can be a source of danger because of their electrical conductivity, for example in the event of lightening strike or contact between the buoyancy body and overground electrical lines.

Furthermore, many of the multilayer films known from the prior art have a relatively high weight, which impairs the buoyancy of any buoyancy body produced from that type of multilayer film. This is particularly the fact when the medium surrounding the buoyancy body is air.

Another disadvantage of these multilayer films known from the prior art is that they often have unsuitable mechanical properties, for example inadequate puncture resistance or extensibility.

There is therefore a requirement for multilayer films which are suitable for the production of buoyancy bodies with less risk than the known buoyancy bodies.

It was therefore an object of the present invention to provide a multilayer film which, despite its high level of gas-barrier activity, is suitable for the production of buoyancy bodies, whereby these flying or floating bodies are not a source of danger—as described above.

Said object is solved by the provision of a multilayer film without any metal layer, with a weight per unit area of ≤33 g/m² and with an at least six-layer, preferably at least nine-layer, layer structure comprising (a) a layer (a) composed of at least one thermoplastic olefin homo- or copolymer, as one of the external layers, (b) an adhesion-promoter layer (b) that according to the definition of the present invention is non-peelable, optionally having a plurality of sublayers, (c) a layer (c) composed of at least one homo- and/or copolyamide and optionally having a plurality of sublayers, (d) at least one internal gas-barrier layer (d) which adjoins the layer (c) and which optionally has a plurality of sublayers and which differs at least in the composition of the polymer component(s) from the layers (c) and (e), (e) a layer (e) which adjoins the gas-barrier layer (d) and which optionally has a plurality of sublayers and is composed of at least one homo- and/or copolyamide, and (i) a layer (i) composed of at least one homo- and/or copolyamide as one of the external layers, where the shrinkability of said multilayer film, determined as dimensional change in accordance with DIN 53377, is ≤10% at 90° C., both in machine direction and perpendicularly to machine direction.

The expression "metal-layer-free" or "without metal layer" means according to the invention that the multilayer film comprises no metal layer, i.e. no metal foil or vapor-deposition layer made of a metal or of a metal compound, e.g. aluminum or aluminum oxide. However, the layers of the multilayer film of the invention can include small amounts of metal-containing additives such as metal compounds, for example as dies, where said metal-containing additives are preferably present in dispersed form within the respective layer(s) and do not form any coherent layer.

None of the adhesion-promoter layers of the metal-layer-free multilayer films of the invention is peelable, i.e. separable via cohesion peel of the respective adhesion-promoter layer.

The expression "machine direction" in the invention means the production direction in which the multilayer film is produced and optionally rolled up.

In one preferred embodiment, the metal-layer-free multilayer film of the invention, with weight per unit area ≤33 g/m², has an at least nine-layer layer structure comprising (a) a layer (a) composed of at least one thermoplastic olefin homo- or copolymer, as one of the external layers, (b) an adhesion-promoter layer (b) that according to the definition of the present invention is non-peelable, optionally having a plurality of sublayers, (c) a layer (c) composed of at least one homo- and/or copolyamide, (d) at least one internal gas-barrier layer (d) which adjoins the layer (c) and which differs at least in the composition of the polymer component(s) from the layers (c) and (e);

(e) a layer (e) which adjoins the gas-barrier layer (d) and which is composed of at least one homo- and/or copolyamide, (f) an adhesion-promoter layer (f) that according to the definition of the present invention is non-peelable, optionally having a plurality of sublayers, (g) at least one internal layer (g) composed of at least one thermoplastic olefin homo- or copolymer, (h) an adhesion-promoter layer (h) that according to the definition of the present invention is non-peelable, optionally having a plurality of sublayers, (i) a layer (i) composed of at least one homo- and/or copolyamide as one of the external layers, and is characterized in that the shrinkage of the multilayer film, determined as dimensional change in accordance with DIN 53377, is ≤10% at 90° C., both in machine direction and perpendicularly to machine direction.

In one preferred embodiment, the shrinkage of the multilayer film of the invention, determined as dimensional change in accordance with DIN 53377, is ≤7%, preferably ≤5% at 90° C., both in machine direction and perpendicularly to machine direction.

Another feature of the multilayer film of the invention is low weight per unit area of ≤33 g/m², preferably ≤31 g/m², particularly preferably ≤28 g/m².

The multilayer film of the invention preferably has high puncture resistance, particularly preferably of at least 100 N, very particularly preferably of at least 120 N, determined in accordance with DIN 53373.

The extensibility of the multilayer film of the invention, both in machine direction and perpendicularly to machine direction, is preferably at least 60%, particularly preferably at least 80%, and very particularly preferably at least 100%. Extensibility in machine direction can be higher than perpendicularly thereto, but it is preferable that extensibility in machine direction and in the direction perpendicular thereto are approximately identical.

The average density of the multilayer film of the invention is preferably at most 1.1 g/cm³, particularly preferably at most 1.05 g/cm³.

The layer (a) and the optionally present layer (g) of the multilayer film of the invention are respectively, being identical or different from one another, composed of at least one thermoplastic olefin homo- or copolymer.

The layer (a) and the layer (g) which is optionally also present in the multilayer film of the invention can preferably be produced by using respectively, identically or differently from one another, thermoplastic olefin homo- or copolymers of α,β-unsaturated olefins having 2-10 carbon atoms and/or cycloolefin copolymers (COCs).

Suitable olefin homopolymers are preferably selected from the group comprising ethylene homopolymers (polyethylenes, PEs), preferably LDPE and HDPE, propylene homopolymers (polypropylenes, PPs), butylene homopolymers (polybutylenes, PBs) and isobutylene homopolymers (polyisobutylenes, PIBs) or a mixture of at least two of the polymers mentioned. "LDPE" means low-density polyethylene, the density of which is in the region of 0.86 to 0.93 g/cm³, and which features a high degree of branching of the molecules. "HDPE" means high-density polyethylene which has only a small extent of branching of the molecular chain, where the density can be in the range from 0.94 to 0.97 g/cm³.

Suitable olefin copolymers are preferably copolymers of ethylene and/or propylene and of at least one α-olefin having at least 4, preferably having 4-10, particularly preferably having 4-8, carbon atoms, very particular preference being given to copolymers of ethylene and/or propylene with at least one α-olefin selected from the group comprising butene, hexene and octene. The α-olefin content in the olefin copolymer is preferably at most 25% by weight, particularly preferably at most 15% by weight, based in each case on the total weight of the olefin copolymer.

Particularly suitable copolymers of ethylene and of at least one α-olefin having at least 4 carbon atoms are LLDPE and/or mPE. "LLDPE" means linear low-density ethylene copolymers which are characterized by the presence of a linear main chain with pendant chains located thereon, and the density of which is in the region of 0.86 and 0.94 g/cm³. "mPE" means ethylene copolymers polymerized by means of metallocene catalysts, the density of these preferably being in the region of 0.88 and 0.93 g/cm³.

Particularly suitable copolymers of propylene are copolymers of propylene and of at least one α-olefin having 2 or 4-6 carbon atoms, particularly preferably selected from the group comprising propylene-ethylene copolymers, propylene-butylene copolymers, propylene-isobutylene copolymers and mixtures of at least two of the copolymers mentioned.

Preferred olefin homo- or copolymers for the production of the layer (a) and of the layer (g) that is optionally present are respectively, being identical or different from one another, ethylene homo- and copolymers and/or propylene homo- and copolymers.

For the production of the layer (a) particular preference is given to ethylene homo- and/or copolymers, very particular preference being given to LDPE and/or LLDPE, and in particular a mixture of at least one low-density ethylene homopolymer (LDPE) and of at least one linear low-density polyethylene (LLDPE).

For the production of the layer (g) that is optionally present, particular preference is given to polypropylene homo- and/or copolymers, in particular propylene copolymers.

The production of the layer (a) and of the layer (g) that is optionally present in the multilayer film of the invention can also use respectively, identical or differently from one another, cycloolefin copolymers (COCs), preferably in a mixture with a thermoplastic olefin homo- or copolymer of α,β-unsaturated olefins having 2-10 carbon atoms. The expression "cycloolefin copolymer" or "COC" means for the purposes of the present invention an amorphous copolymer which is produced via copolymerization of cyclic ($C_6$-$C_{12}$)-olefin monomers, preferably norbornene or tetracyclododecene, with a ($C_2$-$C_4$)-olefin such as ethylene.

In one particular embodiment, the cycloolefin copolymer is a ($C_6$-$C_{12}$)-cycloolefin-($C_2$-$C_4$)-olefin copolymer, preferably a norbornene/ethylene copolymer or a tetracyclododecene/ethylene copolymer, particularly preferably a norbornene/ethylene copolymer.

The content of the structural units derived from at least one cycloolefin in the cycloolefin copolymer is preferably at least 50% by weight, particularly preferably at least 70% by weight, based on the total weight of the cycloolefin copolymer.

Particular preference is given to mixtures of cycloolefin copolymers (COCs) and of thermoplastic olefin homo- or copolymers of α,β-unsaturated olefins having 2-10 carbon atoms in which the content of the cycloolefin copolymer component is at most 50% by weight, preferably at most 40% by weight, and particularly preferably 20-35% by weight.

The layer (a) is preferably sealable, particularly preferably heat-sealable.

The multilayer film of the invention has at least one adhesion-promoter layer (b) which optionally can have a plurality of sublayers, preferably two sublayers, and is not peelable, in particular not separable via cohesion peel.

It is preferable that the multilayer film of the invention has at least three adhesion-promoter layers (b), (f) and (h) which optionally respectively identically or differently from one another, can have a plurality of sublayers, preferably two sublayers, and are not peelable according to the definition of the invention.

Adhesion promoters that can be used are conventional adhesion promoters. It is preferable that the adhesion-promoter layer (b) and the adhesion-promoter layers (f) and (h) optionally present, being identical or different from one another, are composed of at least one modified thermoplastic polymer, preferably of at least one modified polyolefin homo- or copolymer, particularly preferably of at least one modified propylene homo- or copolymer which has been modified with at least one organic acid or with at least one organic anhydride, preferably with maleic anhydride.

To the extent that the adhesion-promoter layers (b), (f) and (h) are present, they can be identical or different.

In one preferred embodiment of the multilayer film of the invention, to the extent that the adhesion-promoter layers (b) and the adhesion-promoter layers (f) and (h) are present they have an identical layer structure, preferably an identical layer thickness and/or an identical composition of the polymer component(s).

In another preferred embodiment of the multilayer film of the invention, at least one of the adhesion-promoter layers (b) and of the adhesion-promoter layers (f) and (h) optionally present has a plurality of sublayers, preferably two sublayers. The two or more sublayers of the adhesion-promoter layer(s) having a plurality of sublayers can respectively, being identical or different, be composed of the modified thermoplastic polymers mentioned and can be non-peelable according to the definition of the invention.

The multilayer film of the invention comprises at least one layer (c) which optionally has a plurality of sublayers, one layer (e) which optionally has a plurality of sublayers, and one layer (i) which respectively, being identical or different from one another, are composed of at least one homo- and/or copolyamide, where the layer (i) is an external layer.

Material suitable for the production of the layers (c), (e) and (i) are homo- and/or copolyamides selected from the group of the thermoplastic aliphatic, semiaromatic or aromatic homo- or copolyamides.

Said homo- or copolyamides can be produced from aliphatic diamines having 2-10 carbon atoms, in particular hexamethylenediamine, and/or from aromatic diamines having 6-10 carbon atoms, in particular p-phenylenediamine, and from dicarboxylic acids such as aliphatic or aromatic dicarboxylic acids having 6-14 carbon atoms, e.g. adipic acid, terephthalic acid or isophthalic acid. It is also possible to produce homo- or copolyamides from one or more lactams having 4-10 carbon atoms, e.g. ε-caprolactam. Copolyamides can also be produced from the aliphatic and/or aromatic diamines, dicarboxylic acids and lactams mentioned, e.g. from hexamethylenediamine, adipic acid and ε-caprolactam (PA 6/66). Particularly preferred polyamides are PA 6, PA 12, PA 66, PA 6I, PA 6T or corresponding copolymers of at least two of the structural units mentioned, an example being PA 6/66, or a mixture of at least two of the polyamides mentioned.

The layers (c), (e) and (i) can be identical or different.

In one preferred embodiment of the multilayer film of the invention, the layers (c) and (e) have an identical layer structure, preferably an identical layer thickness and/or identical polyamide components and/or an identical composition.

Particularly preferred homo- or copolyamides for the production of the layers (c) and (e) are semiaromatic, amorphous or semicrystalline copolyamides which can optionally be present in a mixture with at least one homopolyamide and/or with at least one other copolyamide. These semiaromatic, amorphous or semicrystalline copolyamides are preferably produced from aliphatic diamines having 2-10 carbon atoms, in particular hexamethylenediamine, and from aromatic dicarboxylic acids having 6-14 carbon atoms, e.g. terephthalic acid or isophthalic acid, and/or from aromatic diamines having 6-10 carbon atoms, in particular p-phenylenediamine or m-Xylylenediamine, and from aliphatic dicarboxylic acids having 6-14 carbon atoms, e.g. adipic acid. Examples of very particularly preferred copolyamides for the production of the layers (c) and (e) are PA 6I/6T (from the monomers hexamethylenediamine, terephthalic acid and isophthalic acid) and MXD6/MXDI (from the monomers m-Xylylenediamine, adipic acid and isophthalic acid).

In another preferred embodiment of the multilayer film of the invention, at least one of the layers (c) and (e) has a plurality of sublayers, preferably two, three, four, or five sublayers. The two, three, four, five or more sublayers of the layers (c) and/or (e) having a plurality of sublayers can respectively, being identical or different, be composed of the homo- or copolyamides mentioned.

The multilayer film of the invention has at least one internal gas-barrier layer (d) which adjoins the layers (c) and (e) and which differs at least in the composition of the polymer component(s) from layers (c) and (e).

The gas-barrier layer (d) optionally having a plurality of sublayers is preferably composed of at least one ethylene-vinyl alcohol copolymer, at least one polyvinyl alcohol, at least one polyvinylidene chloride, at least one homo- or copolyamide, or a mixture of at least two of these polymers.

To the extent that the gas-barrier layer (d) is composed of at least one ethylene-vinyl alcohol copolymer (EVOH), this has preferably been obtained via, in essence complete, hydrolysis of a corresponding ethylene-containing polyvinyl acetate (EVAc). The degree of hydrolysis of these fully hydrolyzed ethylene-containing polyvinyl acetates is ≥98%, and they have 0.01-80 mol % ethylene content, preferably 1-50 mol %.

The amount of the ethylene component in the ethylene-vinyl alcohol copolymer is preferably at most 44 mol %, particularly preferably at most 35 mol %, and very particularly preferably 20-32 mol %.

To the extent that the gas-barrier layer (d) is composed of at least one polyvinyl alcohol (PVOH), this has preferably been obtained by an essentially complete, hydrolysis of a polyvinyl acetate (PVAc), and is a fully hydrolyzed polyvinyl acetate with ≥98% degree of hydrolysis.

Preferred homo- or copolyamides for the production of the gas-barrier layer (d) are the abovementioned semiaromatic, amorphous or semicrystalline copolyamides, which optionally can be present in a mixture with at least one homopolyamide and/or with at least one other copolyamide.

In one particularly preferred embodiment of the multilayer film of the invention, the gas-barrier layer (d) is based on at least one ethylene-vinyl alcohol copolymer, on at least one amorphous polyvinyl alcohol and/or on at least one semiaromatic, amorphous copolyamide or semiaromatic, semicrystalline copolyamide; in particular on at least one ethylene-vinyl alcohol copolymer.

A preferred amorphous polyvinyl alcohol is obtainable commercially as Nichigo G-Polymer® (Nippon Gohsei, Japan).

In another preferred embodiment of the multilayer film of the invention, the gas-barrier layer (d) has a plurality of sublayers, preferably two sublayers. The two or more sublayers of the gas-barrier layer (d) having a plurality of sublayers can respectively, being identical or different, be composed of the polymer components mentioned.

In one preferred embodiment of the multilayer film of the invention, the gas-barrier layer (d) serves as an air-, helium-, oxygen- and/or water-vapor-barrier layer.

The helium transmission of the multilayer film of the invention is preferably at most 3000 cm$^3$/(m$^2$·24 h·bar), particularly preferably at most 1500 cm$^3$/(m$^2$·24 h·bar), and very particularly preferably at most 1000 cm$^3$/(m$^2$·24 h·bar), determined in accordance with DIN 53380-2 at 23° C. and 0% humidity.

The oxygen transmission of the multilayer film of the invention is preferably at most 8 cm$^3$/(m$^2$·24 h·bar), particularly preferably at most 5 cm$^3$/(m$^2$·24 h·bar), and very particularly preferably at most 2 cm$^3$/(m$^2$·24 h·bar), determined in accordance with DIN 53380-2 at 23° C. and 0% humidity.

The nitrogen transmission of the multilayer film of the invention is preferably at most 8 cm³/(m²·24 h·bar), particularly preferably at most 5 cm³/(m²·24 h·bar), and very particularly preferably at most 2 cm³/(m²·24 h·bar), determined in accordance with DIN 53380-2 at 23° C. and 0% humidity.

In one preferred embodiment, the layers (a)-(e) and (i), preferably (a)-(i), are present in the stated sequence. Additional layers can optionally be present respectively between the layers (a) and (b), (b) and (c) and/or (e) and (i). If the layers (a)-(i) are present, additional layers can optionally be present respectively between the layers (a) and (b), (b) and (c), (e) and (f), (f) and (g), (g) and (h) and/or (h) and (i).

To the extent that the additional layers are adhesion-promoter layers, they are not peelable for the purposes of the invention.

In one preferred embodiment, the multilayer film has a nine-layer layer structure. In this embodiment the multilayer film is preferably composed of the layers (a)-(i), preferably in the sequence (a), (j), (b), (c), (d), (e), (f), (k), (g), (h) and (i).

In another preferred embodiment, the multilayer film of the invention also comprises at least one internal layer which preferably adjoins the layer (a): (j), and/or comprises an internal layer which is preferably situated between the layers (f) and (g): (k), preferably respectively, being identical or different from one another, composed of at least one thermoplastic olefin homo- or copolymer or of an adhesion promoter.

The polymer composition of the layer (j) is preferably different from that of the layer (a). It is preferable that the softening point of the layer (j) is higher than that of the layer (a).

In one preferred embodiment of the multilayer film of the invention having up to eleven layers, to the extent that the layer (j) and/or the layer (k) is present these are respectively, being identical or different from one another, based on an adhesion promoter, preferably on at least one modified thermoplastic polymer. In this preferred embodiment, the adhesion-promoter layer (b) and the layer (j) respectively form a sublayer of an adhesion-promoter layer (b) having a plurality of sublayers and/or the adhesion-promoter layer (f) and the layer (k) respectively form a sublayer of an adhesion-promoter layer (f) having a plurality of sublayers.

In another preferred embodiment of the multilayer film of the invention, the layer (j) is based on at least one ethylene homo- or copolymer, particularly preferably on at least one LDPE and/or LLDPE, and in particular on at least one linear low-density polyethylene (LLDPE).

In another preferred embodiment of the multilayer film of the invention, the layer (k) is based on at least one ethylene homo- or copolymer and/or on at least one propylene homo- or copolymer, particularly preferably on at least one propylene copolymer.

In one preferred embodiment, the multilayer film has an at least ten-layer or eleven-layer layer structure. In this embodiment, the multilayer film is preferably composed of the layers (a)-(i), (j) and/or (k), particularly preferably in the sequence (a), (j)—if present, (b), (c), (d), (e), (f), (k)—if present, (g), (h), and (i).

In another preferred embodiment, at least one of the layers (b)-(e) has a plurality of sublayers.

In one preferred embodiment, the multilayer film has the layers (a), (b), (c), (d), (e) and (i), where the layers (c) and (e) respectively have a plurality of sublayers. By way of example, the layer (c) can have two sublayers and the layer (e) can have five sublayers.

In another preferred embodiment, the multilayer film has the layers (a), (b), (c), (d), (e) and (i), where the adhesion-promoter layer (b) and the layer (e) respectively have a plurality of sublayers. By way of example, the adhesion-promoter layer (b) can have two sublayers and the layer (e) can have five sublayers.

In another preferred embodiment, the multilayer film of the invention with the layers (a)-(e) and (i) comprises at least one internal gas-barrier layer (l) which preferably adjoins the layer (e) and which optionally has a plurality of sublayers, preferably two sublayers, and which is composed of at least one ethylene-vinyl alcohol copolymer, of at least one amorphous polyvinyl alcohol and/or of at least one semiaromatic, amorphous copolyamide or semiaromatic, semicrystalline copolyamide; in particular of at least one ethylene-vinyl alcohol copolymer, and optionally also comprises a layer (m) which adjoins the gas-barrier layer (l) and the layer (i) and which optionally has a plurality of sublayers, and which is composed of at least one homo- and/or copolyamide. By way of example, the multilayer sequence of the invention can be composed of the layers (a), layer (b) which optionally has two sublayers, (c), (d), (e), layer (l) having two sublayers, layer (m) having two sublayers, and layer (i).

Irrespective of the number of layers therein, the total thickness of the multilayer film is preferably at most 30 μm, particularly preferably at most 28 μm.

It is preferable that the outer layer (a) and the optionally present layer (j), to the extent that this is not an adhesion-promoter layer, together have a layer thickness of at least 2 μm, particularly preferably from 3 to 6 μm.

The adhesion-promoter layers (b), the optionally present adhesion-promoter layers (f) and (h), the optionally present layer (k), to the extent that this is an adhesion-promoter layer, and the optionally present layer (j), to the extent that this is an adhesion-promoter layer, preferably have respectively mutually independently a layer thickness of from 0.5 μm to 4 μm, particularly preferably from 0.5 μm to 2.5 μm, in the multilayer film of the invention.

The layers (c) and (e) preferably have respectively mutually independently a layer thickness of from 2 μm to 7 μm, particularly preferably from 2 μm to 5 μm.

The gas-barrier layer (d) preferably has a layer thickness of at most 5 μm, particularly preferably at most 3 μm and very particularly preferably from 0.75 μm to 2.0 μm.

The layers (g) and (k), if present and to the extent that (k) is not an adhesion-promoter layer, together preferably have a layer thickness of from 3 μm to 12 μm, particularly preferably from 3.5 μm to 8 μm.

The outer layer (i) preferably has a layer thickness of from 1 μm to 8 μm, particularly preferably from 1 μm to 5 μm.

The layer thickness of the gas-barrier layer (d) is preferably at most 15%, based on the total thickness of the multilayer film, particularly preferably at most 12%, very particularly preferably at most 10%.

In one preferred embodiment, the layer thickness of the layers (g) and (k), if present and to the extent that (k) is not an adhesion-promoter layer, together is at least 10%, based on the total thickness of the multilayer film, particularly preferably at least 15%, very particularly preferably at least 18%.

In one preferred embodiment, the layer thickness of the layer (a), of the optionally present layer (g), of the optionally present layer (k), to the extent that this is not an adhesion-promoter layer, and of the optionally present layer (j), to the extent that this is not an adhesion-promoter layer, together is at least 20%, based on the total thickness of the multilayer film, particularly preferably at least 30%, very particularly preferably at least 35%.

The layers (a) to (e) and (i), and also the optionally present layers (f), (g), (h), (j), (k), (l) and/or (m) can respectively mutually independently have been doped with additives selected from the group comprising antioxidants, antiblocking agents, antifogging agents, antistatic agents, antimicrobial ingredients, light stabilizers, UV absorbers, UV filters, dyes, color pigments, stabilizers, preferably heat stabilizers, process stabilizers and UV and/or light stabilizers, preferably based on at least one sterically hindered amine (HALS), processing aids, flame retardants, nucleating agents, lubricants, optical brighteners, flexibilizers, sealing agents, plasticizers, spacers, fillers, peel additives, waxes, wetting agents, surface-active compounds, preferably surfactants, and dispersing agents, where adhesion-promoter layers comprise no peel additives. The content of the abovementioned additives here can—to the extent that they are present in a layer, respectively be 0.001-20% by weight, preferably 0.01-10% by weight, based in each case on the total weight of the individual layer.

In one preferred embodiment, the multilayer film of the invention is sealable, preferably heat-sealable, and it is preferable here that the layer (a) is heat-sealable.

In one preferred embodiment, the multilayer film of the invention is transparent.

The multilayer film of the invention can be printed by means of known printing processes, preferably by means of a digital printing process, and/or can have been colored. The print is preferably produced on the layer (i). The coloring is preferably achieved by equipping at least one layer, preferably the optionally present layer (g), the optionally present layer (j) and/or the optionally present layer (k), with at least one colorant, preferably with at least one dye and/or color pigment, as additive.

In one preferred embodiment, the layers (a)-(e) and (i), and also the optionally present layers (f), (g), (h), (j), (k), (l) and/or (m) of the multilayer film of the invention can be produced and processed as entire multilayer film, preferably in the form of a tubular film.

It is preferable that the entire multilayer film of the invention can be produced by the blown-film-coextrusion process, preferably by the triple-bubble coextrusion process.

These production processes and corresponding parameters are well known to the person skilled in the art. The production of multilayer films with the aid of the triple-bubble coextrusion process is described by way of example in James D. Stobie, "Producing coextruded high barrier heat-shrinkable packaging films", PAPER, FILM & FOIL CONVERTER, [on-line] 1 Oct. 2003.

It is preferable here that the tubular film is stretched biaxially in longitudinal and transverse direction respectively with a stretching ratio of at least 1:1.5, particularly preferably of at least 1:2, very particularly preferably of from 1:2 to 1:3. It is preferable that the multilayer film is then subjected to a heat treatment in order to establish the shrinkage properties, thus giving 10% shrinkage at 90° C., determined as dimensional change in accordance with DIN 53377.

A feature of the multilayer film of the invention is that it has excellent extensibility and moreover low gas transmission, in particular helium, oxygen and air transmission. The multilayer film of the invention can therefore be subjected to tensile strain without impairment of its gas-barrier effect.

Another feature of the multilayer film of the invention is that it has low shrinkage. A plurality of segments of the multilayer film of the invention can therefore be bonded by way of a seal seam without any adverse effect on the sealing process due to shrinkage of the multilayer film.

Other features of the multilayer film of the invention are that it has high puncture resistance and has no electrical conductivity.

The multilayer film of the invention is therefore preferably suitable for the production of a buoyancy body.

The invention therefore further provides the use of a multilayer film of the invention for the production of a buoyancy body.

The invention therefore further provides a buoyancy body at least partially formed of a multilayer film of the invention.

For the purposes of the invention, the expression "buoyancy body" means a wrapper that is in essence gastight, filled with a buoyant gas.

For the purposes of the invention, the expression "buoyant gas" means a gas or a gas mixture with density lower than that of the medium surrounding the buoyancy body. The medium surrounding the buoyancy body is water in the case of a flotation body, and air in the case of an aircraft or balloon.

In one preferred embodiment, the wrapper of the buoyancy body is composed of at least two preferably identically designed segments, connected by a seal seam, of the multilayer film of the invention, and optionally has a gas-supply duct. The seal seam is preferably at the outer wrapper edge of the segments and has in the region of the gas-supply duct—to the extent that this is present—a gap which can comprise a gas-supply and/or gas-outlet device, for example in the form of a valve. The arrangement of the segments of the inventive multilayer film at the wrapper is preferably such that the layer (i) of the multilayer film is in contact with the medium surrounding the buoyancy body and the layer (a) faces inwardly and is in contact with buoyant gas.

To produce the buoyancy body of the invention, at least two, preferably identically designed segments of the multilayer film described above are shaped to give the wrapper of the buoyancy body by sealing respectively in the region of the outermost edge of the layer (a), the outer edge is optionally cut away from the seal seam, and the wrapper is preferably also provided with a gas-supply and/or gas-outlet device and filled with a buoyant gas.

The buoyancy body is preferably a flotation body or at least a component of an aircraft.

In one preferred embodiment the inventive multilayer film is used for an inventive buoyancy body and as buoyancy body it is at least a component of an aircraft, preferably of an airship, of hot-air balloons, of free balloons, of captive balloons, of pilot balloons or research balloons.

It is preferable that the buoyant gas of the buoyancy body is helium, hydrogen or a helium-air mixture.

In one particularly preferred embodiment the inventive multilayer film used for an inventive buoyancy body is a balloon.

It is preferable that the balloon contains a gas selected from the group consisting of helium, a helium-nitrogen mixture, hydrogen and a helium-air mixture as buoyant gas.

In one preferred embodiment, the wrapper of the balloon is composed of at least two preferably identically designed segments, connected by a seal seam, of the inventive multilayer film and has a gas-supply duct and also optionally has a gas-inlet and—outlet valve. The seal seam is preferably at the edge of the two segments and has in the region of the gas-supply duct a gap which preferably comprises a gas-inlet and gas-outlet valve. There is a gastight join where the sealed segments enclose the casing of the gas-inlet and gas-outlet valve. The arrangement of the segments of the inventive multilayer as wrapper of the balloon is preferably such that the layer (i) is in contact with the medium surrounding the balloon and the layer (a) faces into the interior of the balloon and is in contact with buoyant gas.

To produce the balloon of the invention, at least two, preferably identically designed segments of the inventive multilayer film are punched out and shaped by sealing at the region of the outermost edge of the layer (a), to give a balloon body which has a gas-supply duct, and also optionally has a gas-inlet and -outlet valve. After filling with a gas, preferably helium or a helium-air mixture, a gastight seal of the gas-supply duct is achieved, preferably by knotting the material surrounding the gas-supply duct, or by closing the optionally present gas valve.

The inflated balloon can have any desired shape. For example it can have an ellipsoidal, spherical, tubular, or cordate shape, or the shape of an animal or of a comic figure, or can have any desired individual shape, and can optionally have been printed with motifs, photographs, congratulatory messages and/or any desired texts.

The balloon is preferably capable to fly over a period of at least 3 days, particularly preferably of at least 5 days, in particular of at least 7 days at atmospheric pressure (ambient pressure).

In another preferred embodiment the inventive multilayer film is used for an inventive buoyancy body. The buoyancy body can be a flotation body which is preferably at least a part of a buoy, lifejacket, floating platform, or of a landing stage, or of a boat, preferably a pontoon boat, or of a marine hovercraft.

It is preferable that the flotation body is air-filled.

A feature of the buoyancy body of the invention, in comparison with conventional buoyancy bodies, is that it has low gas transmission, in particular helium and air transmission, and buoyant gas enclosed by the wrapper can therefore escape only very slowly—if at all.

Another feature of the buoyancy body of the invention, in comparison with conventional buoyancy bodies, is that its wrapper has low weight per unit area and has good mechanical properties.

Another feature of the inventive buoyancy body is that its wrapper has no electrical conductivity.

The inventive buoyancy body has a long durability because of its low weight per unit area and because of the low gas transmission of its wrapper.

Another feature of the inventive buoyancy body is its high puncture resistance.

Determination of Puncture Resistance

The puncture resistance of the multilayer film of the invention is determined in accordance with DIN 53373 under standard conditions, 23° C. with 50% relative humidity, and is stated in [N].

Determination of Helium and Oxygen Transmission

The helium and oxygen transmission of the multilayer film of the invention are determined in accordance with DIN 53380-2 at 23° C. with 0% humidity, and are stated in $cm^3/(m^2 \cdot 24\ h \cdot bar)$.

EXAMPLES

The inventive examples and comparative examples below serve to illustrate the invention, but are not to be interpreted as restrictive.

I. Chemical Characterization of Raw Materials Used

LLDPE: Producer: Dow Chemicals
  Density: $0.92\ g/cm^3$
  Melt volume rate: 1.1 g/10 min (190° C./2.16 kg)
  Comonomer: 1-Octene LDPE: Producer: LyondellBasell Industries
  Density: $0.924\ g/cm^3$
  Melt volume rate: 1.9 g/10 min (190° C./2.16 kg)

Polypropylene copolymer:
  Producer: LyondellBasell Industries
  Density: $0.90\ g/cm^3$
  Melt volume rate: 5.5 g/10 min (230° C./2.16 kg)
  Comonomer: Ethylene Adhesion promoter: Producer: Mitsui Chemicals
  Density: $0.90\ g/cm^3$
  Melt volume rate: 2.5 g/10 min (190° C./2.16 kg)
  Polyethylene, modified with maleic anhydride Polyamide: Producer: Ems-Chemie AG
  Density: $1.14\ g/cm^3$
  Melt volume rate: 25 $cm^3$/10 min (275° C./5 kg)
  PA6

Amorphous PA: Producer: Ems-Chemie AG
  Density: $1.18\ g/cm^3$
  Melt volume rate: 25 $cm^3$/10 min (275° C./5 kg)
  PA6I/6T EVOH: Producer: Nippon Gohsei Europe GmbH
  Density: $1.21\ g/cm^3$
  Melt volume rate: 3.8 g/10 min (210° C./2.16 kg)
  Ethylene content: 29% by weight II. Production of the Multilayer Film of the Invention The multilayer film of the invention is composed of 10 layers, one of these having two sublayers, and has a total layer thickness of 20 μm and a weight per unit area of 20.1 $g/m^2$. The individual layers of the multilayer film of the invention are respectively immediately adjacent to one another in the sequence in which they are listed below. The multilayer film was produced by blown-film coextrusion by the triple-bubble process with a blow-up ratio or stretching ratio of 3.0 in machine direction and 2.4 in transverse direction. The average shrinkage values of the resultant film, both in machine direction and in transverse direction, are 5%.

III. Production of the Comparative Film

The comparative film is composed of 5 layers, and has a total layer thickness of 32 μm and a weight per unit area of 34.8 $g/m^2$. The individual layers are immediately adjacent to one another in the sequence in which they are listed below. The multilayer film was produced by coextrusion, and has shrinkage values of about 30% in both directions.

IV. Inventive Example and Comparative Example

All of the % data below are % by weight.

IV.1 Inventive Example IE1

Layer (a) (3.2 μm): 70% LDPE+30% LLDPE
Layer (j) (0.6 μm): LLDPE
Layer (b) (1.6 μm): adhesion promoter
Layer (c) (2.3 μm): mixture of 80% of PA 6 and 20% of amorphous polyamide
Layer (d) (2.0 μm): EVOH
Layer (e) (2.3 μm): mixture of 80% of PA 6 and 20% of amorphous polyamide
Layer (f) (having two sublayers: 0.8 μm/0.8 μm): adhesion promoter/adhesion promoter
Layer (g) (4.0 μm): polypropylene copolymer
Layer (h) (1.2 μm): adhesion promoter
Layer (i) (1.2 μm): polyamide Total layer thickness: 20 μm
Weight per unit area: 20.1 g/m²
Average density: 1.01 g/cm³

IV.2 Comparative Example CE1

Qualatex

Layer (a) (10 μm; 17.3 g/m²): 40% LDPE+60% LLDPE
Layer (b): adhesion promoter
Layer (d) (5 μm; 5.9 g/m²): EVOH, 24% ethylene
Layer (h): adhesion promoter
Layer (i) (15 μm; 9.3 g/m²): polyamide 6/66
Total layer thickness: 32 μm
Weight per unit area: 34.8 g/m²
Average density: 1.087 g/cm³

V. Determination of Oxygen and Helium Transmission and Puncture Resistance

The methods described above were used to determine oxygen and helium transmission and puncture resistance respectively for the multilayer film of the inventive example (IE1) and of the comparative example (CE1).

The values are respectively the average values from measurements on 2 samples.

| Inventive example/comparative example | Helium transmission at 23° C./0% rel. humidity [cm³/(m² · 24 h · bar)] | Oxygen transmission at 23° C./0% rel. humidity [cm³/(m² · 24 h · bar)] | Puncture resistance [N] |
|---|---|---|---|
| IE1 | 655 | 1.46 | 156 |
| CE1 | 646 | 3.83 | 174 |

Surprisingly, although the multilayer film of the inventive example (IE1) has 35% lower total layer thickness than the multilayer film of the comparative example (CE1), it has excellent puncture resistance and good barrier effect with respect to helium and oxygen.

What is claimed is:

1. A metal-layer-free multilayer film with a weight per unit area of ≤33 g/m² and with an at least six-layer structure comprising:
   (a) a layer (a) composed of at least one thermoplastic olefin homo- or copolymer, as one of the external layers;
   (b) a non-peelable adhesion-promoter layer (b) optionally having a plurality of sublayers;
   (c) a layer (c) composed of at least one homo- and/or copolyamide and optionally having a plurality of sublayers;
   (d) at least one internal gas-barrier layer (d) which adjoins the layer (c) and which optionally has a plurality of sublayers and which differs at least in the composition of the polymer component(s) from the layer (c) and a layer (e);
   (e) the layer (e) which adjoins the gas-barrier layer (d) and which optionally has a plurality of sublayers and is composed of at least one homo- and/or copolyamide; and
   (i) a layer (i) composed of at least one homo- and/or copolyamide as one of the external layers;
   wherein shrinkage of the multilayer film, determined as dimensional change in accordance with DIN 53377, is ≤10% at 90° C., both in machine direction and perpendicular to the machine direction, where the multilayer film comprises no metal foil and no vapor-deposition layer made of a metal or of a metal compound.

2. The metal-layer-free multilayer film as claimed in claim 1, with weight per unit area ≤33 g/m² and with an at least nine-layer layer structure comprising:
   (a) a layer (a) composed of at least one thermoplastic olefin homo- or copolymer, as one of the external layers;
   (b) a non-peelable adhesion-promoter layer (b) optionally having a plurality of sublayers;
   (c) a layer (c) composed of at least one homo- and/or copolyamide;
   (d) at least one internal gas-barrier layer (d) which adjoins the layer (c) and which differs at least in the composition of the polymer component(s) from the layers (c) and (e);
   (e) a layer (e) which adjoins the gas-barrier layer (d) and which is composed of at least one homo- and/or copolyamide;
   (f) an adhesion-promoter layer (f) optionally having a plurality of sublayers;
   (g) at least one internal layer (g) composed of at least one thermoplastic olefin homo- or copolymer;
   (h) a non-peelable adhesion-promoter layer (h) optionally having a plurality of sublayers;
   (i) a layer (i) composed of at least one homo- and/or copolyamide as one of the external layers;
   wherein shrinkage of the multilayer film, determined as dimensional change in accordance with DIN 53377, is ≤10% at 90° C., both in machine direction and perpendicular to the machine direction.

3. The multilayer film as claimed in claim 1, wherein the weight per unit area of the multilayer film is ≤31 g/m².

4. The multilayer film as claimed in claim 1, wherein the total thickness of the multilayer film is at most 30 μm.

5. The multilayer film as claimed in claim 1, wherein the average density of the multilayer film is at most 1.1 g/cm³.

6. The multilayer film as claimed in claim 1, wherein the shrinkage of the multilayer film, determined as dimensional change in accordance with DIN 53377, is ≤7%, both in machine direction and perpendicular to the machine direction.

7. The multilayer film as claimed in claim 1, wherein the gas-barrier layer (d) is composed of at least one ethylene-vinyl alcohol copolymer, at least one polyvinyl alcohol, at least one polyvinylidene chloride, at least one homo- or copolyamide, or a mixture of at least two of these polymers.

8. The multilayer film as claimed in claim 1, wherein the puncture resistance of the multilayer film is at least 100 N, determined in accordance with DIN 53373.

9. The multilayer film as claimed in claim 1, which exhibits a helium transmission of at most 3000 cm³/(m²·24 h·bar), determined in accordance with DIN 53380-2 at 23° C. and 0% humidity.

10. The multilayer film as claimed in claim 1, which exhibits an oxygen transmission of at most 8 cm³/(m²·24 h·bar), determined in accordance with DIN 53380-2 at 23° C. and 0% humidity.

11. The multilayer film as claimed in claim 1, wherein the layer (a) is composed of at least one ethylene homo- or copolymer.

12. The multilayer film as claimed in claim 2, wherein the layer (g) is composed of at least one ethylene homo- or copolymer and/or of at least one propylene homo- or copolymer.

13. The multilayer film as claimed in claim 2, wherein the layers (a)-(i) are present in the stated sequence.

14. The multilayer film as claimed in claim 2, wherein the multilayer film also has at least one internal layer (j) and optionally at least one further internal layer (k), optionally respectively, being identical or different from one another, composed of at least one thermoplastic olefin homo- or copolymer or as a sublayer of the adhesion-promoter layer (b) having a plurality of sublayers and/or of the adhesion-promoter layer (f) having a plurality of sublayers.

15. The multilayer film as claimed in claim 1, wherein the multilayer film has an at least ten-layer layer structure.

16. The multilayer film as claimed in claim 1, wherein the multilayer film is sealable.

17. The multilayer film as claimed in claim 1, wherein the multilayer film has been printed and/or colored.

18. The multilayer film as claimed in claim 1, wherein the multilayer film is at least to some extent transparent and optionally colored.

19. The multilayer film as claimed in claim 1, wherein the multilayer film can be produced by the blown-film-coextrusion process.

20. A method of using a multilayer film as claimed in claim 1 for the production of a buoyancy body.

21. The method as claimed in claim 20, wherein the buoyancy body is at least a component of an aircraft, preferably of an airship, a hot-air balloon, a free balloon, a captive balloon, a pilot balloon, or a research balloon.

22. The method as claimed in claim 20, wherein the buoyancy body is a balloon.

23. The method as claimed in claim 20, wherein the buoyancy body is a flotation body which is optionally a component of a buoy, lifejacket, floating platform, or of a landing stage, or of a boat, or of a marine hovercraft.

24. A buoyancy body comprising a multilayer film as claimed in claim 1.

25. A balloon comprising the multilayer film as claimed in claim 1.

26. A balloon as claimed in claim 25, wherein the balloon is composed of at least two optionally identically designed segments, connected by a seal seam, of the multilayer film, and has a gas-supply duct, and also optionally has a gas-inlet and -outlet valve.

27. The balloon as claimed in claim 25, wherein the inflated balloon has any desired shape, and has optionally been printed with motifs.

* * * * *